(12) United States Patent
Mao et al.

(10) Patent No.: US 10,141,825 B2
(45) Date of Patent: Nov. 27, 2018

(54) VIBRATION MOTOR

(71) Applicants: Lubin Mao, Shenzhen (CN); Wenli Wang, Shenzhen (CN); Hongxing Wang, Shenzhen (CN); Fei Hou, Shenzhen (CN)

(72) Inventors: Lubin Mao, Shenzhen (CN); Wenli Wang, Shenzhen (CN); Hongxing Wang, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 355 days.

(21) Appl. No.: 15/236,698

(22) Filed: Aug. 15, 2016

(65) Prior Publication Data

US 2017/0126088 A1    May 4, 2017

(30) Foreign Application Priority Data

Nov. 3, 2015 (CN) .................... 2015 2 0868918 U

(51) Int. Cl.
*H02K 33/16* (2006.01)

(52) U.S. Cl.
CPC ................................. *H02K 33/16* (2013.01)

(58) Field of Classification Search
CPC ........ H02K 33/00; H02K 33/02; H02K 33/12; H02K 33/16; H02K 33/18; H02K 5/04; H02K 1/34
See application file for complete search history.

(56) References Cited

U.S. PATENT DOCUMENTS

| | | | |
|---|---|---|---|
| 2017/0117788 A1* | 4/2017 | Hou | ..................... H02K 1/34 |
| 2017/0117793 A1* | 4/2017 | Mao | ..................... H02K 99/20 |
| 2017/0120298 A1* | 5/2017 | Mao | ..................... B06B 1/045 |
| 2017/0179804 A1* | 6/2017 | Xu | ..................... H02K 33/00 |
| 2018/0115230 A1* | 4/2018 | Mao | ..................... H02K 11/215 |

* cited by examiner

*Primary Examiner* — Dang Le
(74) *Attorney, Agent, or Firm* — Na Xu; IPro, PLLC

(57) ABSTRACT

A vibration motor is disclosed. The vibration motor includes a housing forming a receiving space; a plurality of elastic members accommodated in the receiving space and connected to the housing; a vibration unit suspended by the elastic members in the receiving space, the vibration unit including a weight having a through hole; a plurality of blocks arranged on the housing, the block at least partially received in the through hole; and a plurality of positioning portions formed on the housing and protruding toward the weight for engaging with the blocks for fixing the blocks.

7 Claims, 5 Drawing Sheets

VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A vibration motor will be drooped down during working, and will further fail because of the drop. For protecting the vibration motor, vibration motors of related arts usually use blocks for preventing the motor from being damaged.

A related vibration motor includes a housing, a vibration unit accommodated in the housing suspended by elastic members, and blocks for protecting the vibration unit. The vibration unit further includes a weight and a restricting hole formed in the weight. The block includes a fastening portion located between the vibration unit and the housing, and a protrusion received in the restricting hole. Along a vibration direction of the vibration unit, a distance between the vibration unit and the protrusion of the block does not exceed the maximum deformation of the elastic member. The block is positioned on the housing by welding. Due to the small size of the block, welding area on the block is so limited that the block cannot be firmly positioned to the housing.

Therefore, an improved vibration motor which can overcome the problems mentioned above is accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
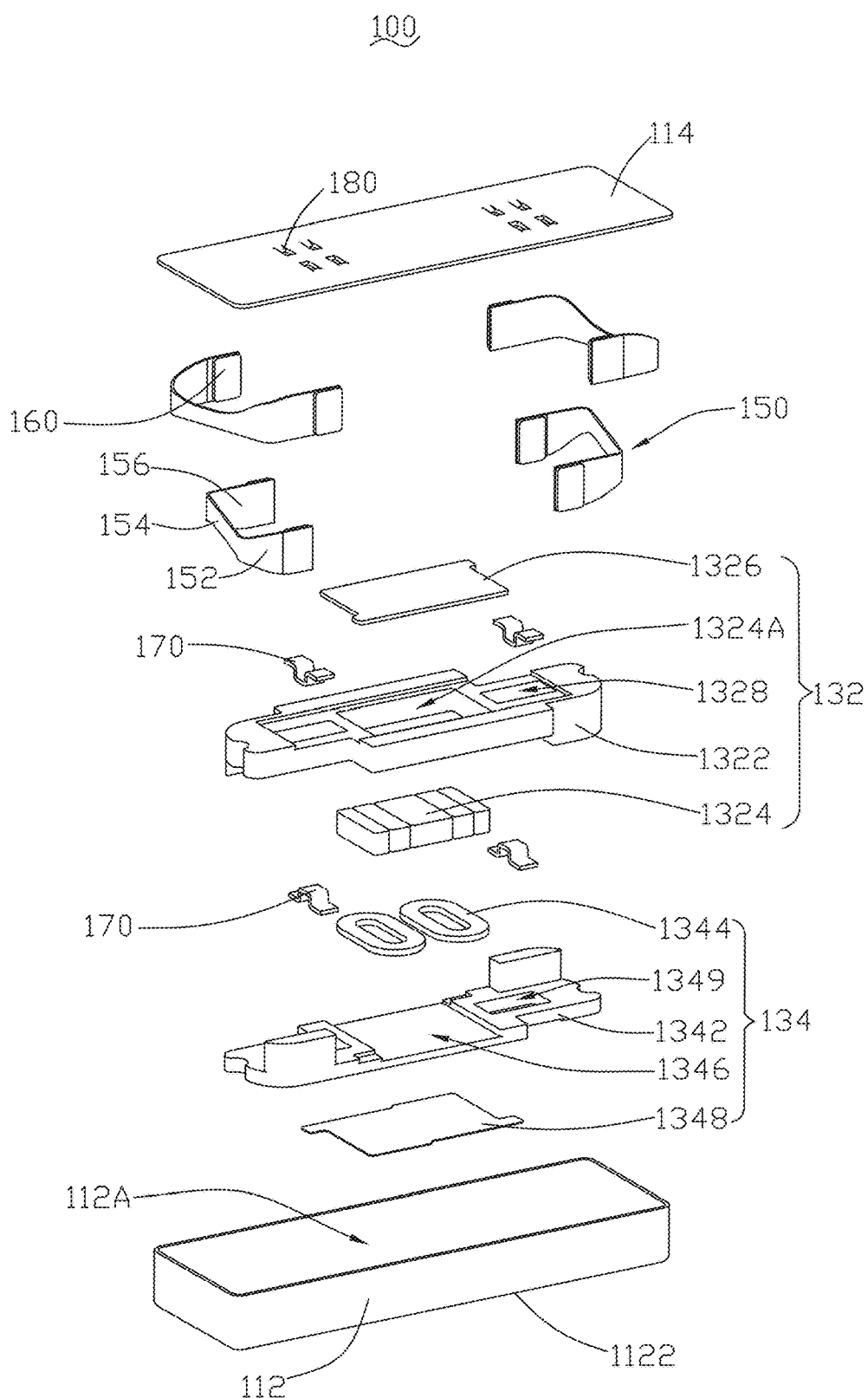
FIG. 1 is an isometric and exploded view of a vibration motor in accordance with an exemplary embodiment of the present disclosure.
Figure 2:
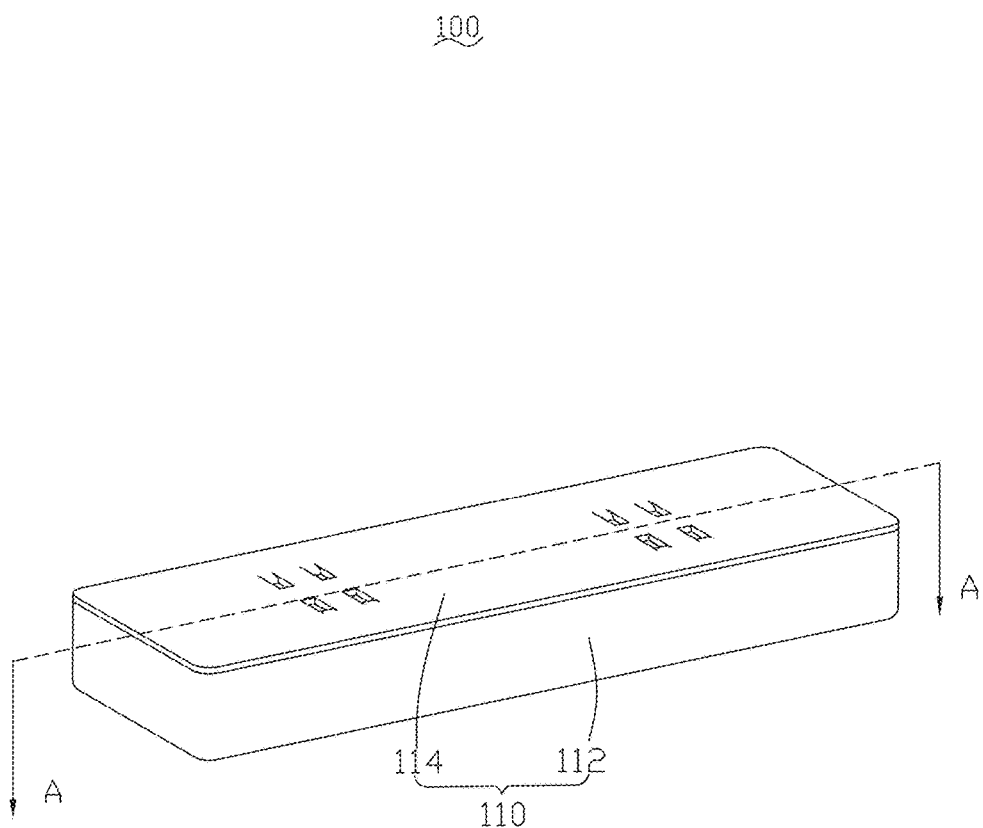
FIG. 2 is an isometric and assembled view of the vibration motor in FIG. 1.
Figure 3:
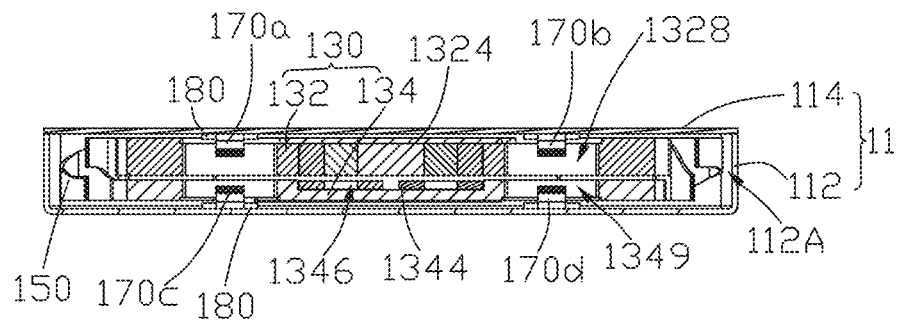
FIG. 3 is a cross-sectional view of the vibration motor taken along Line A-A in FIG. 2.

Referring to FIGS. 1-3, a vibration motor 100 in accordance with an exemplary embodiment of the present disclosure includes a housing 110 formed with a receiving space 112A, a vibration unit 130 accommodated in the receiving space 112A, a plurality of elastic members 150, a plurality of cushions 160, a plurality of blocks 170, and a plurality of positioning portions 180 corresponding to the blocks 170.

The housing 110 includes a shell 112 with an opening and a cover 114 covering the opening of the shell for forming the receiving space 112A. The shell 112 includes a bottom wall 1122 parallel to the cover 114.

The vibration unit 130 comprises a first vibrator 132 and a second vibrator 134 opposed to the first vibrator 132. A distance is formed between the first vibrator and the second vibrator. Both of the first and second vibrators are suspended by the elastic members 150.

A direction X is defined to be parallel to a vibration direction of the vibration unit 130, referring to FIG. 3.

The first vibrator 132 includes a first weight 1322, a magnet 1324, and a first pole plate 1326 attached to a surface of the magnet 1324. The first weight 1322 forms a through hole 1324A for accommodating the magnet 1324 and a first restricting hole 1328 for receiving the block 170. The first weight 1322 is used for enhancing the vibration of the vibration unit.

In this embodiment, the magnet 1324 has 5 pieces arranged in the through hole with one abutting against another. The amount of the restricting hole 1328 is two. The two restricting holes 1328 are arranged at two sides of the though hole 1324A, i.e., at two ends of the first weight 1322.

In the embodiment, the first weight 1322, the magnet 1324 and the first pole plate 1326 form the first vibrator 132.

The second vibrator 134 includes a second weight 1342, a coil 1344, and a second pole plate 1348. The second pole plate 1348 is disposed on a surface of the second weight 1342 facing the bottom wall 1122. The second weight 1342 forms a recess 1346 for receiving the coil 1344, and a second restricting hole 1349 for receiving the blocks 170. The second weight 1342 and the first weight 1322 are opposed to each other. The coil 1344 is received in the recess 1346 and faces the magnet 1324. In addition, the recess 1346 is formed in the second weight 1342 recessed from a surface facing the first vibrator 132. Similar to the first restricting holes, the second restricting holes 1349 are arranged at two sides of the recess 1346, i.e., at two ends of the second weight 1342.

In the embodiment, the second weight 1342, the coil 1344, and the second pole plate 1348 form the second vibrator 134. Alternatively, the coil 1344 could be displaced by other components which can produce magnetic field, for example, an electromagnet.

When the coil is electrified, the coil 1344 produces magnetic field and forces the second vibrator 134 to vibrate. As the direction of the current through the coil is changed alternatively, the magnet 1324 is also forced to vibrate.

The elastic member 150 includes a connecting part 152 engaging with an outer surface of the vibration unit 130, an elastic arm 154 extending from the connecting part 152, and a positioning part 156 extending from the elastic arm 154 and engaging with the shell 112. Two elastic members 150 are used for suspending the first vibrator 132 in the receiving space 112A, and two elastic members 150 are used for suspending the second vibrator 134 in the receiving space 112A.

Further, the cushions 160 are attached to an inner surface of the connecting part 152 adjacent to the shell 112. Similarly, the cushions 160 are also attached to an inner surface of the positioning part 156 away from the shell 112.

Figure 4:
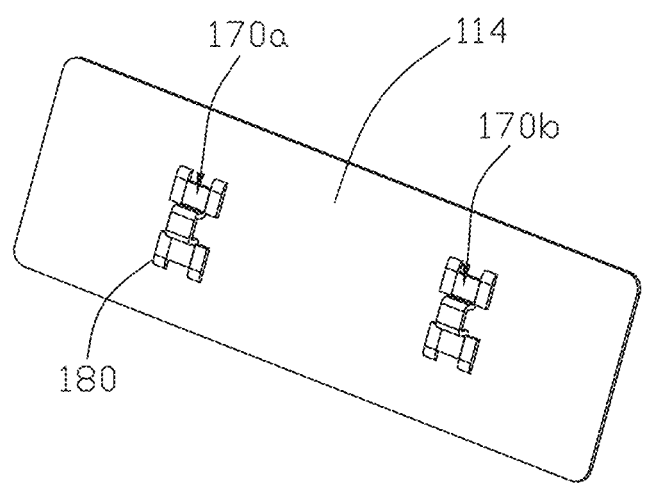
FIG. 4 is an assembled view of a cover, a positioning part, and a block of the vibration motor.
Figure 5:
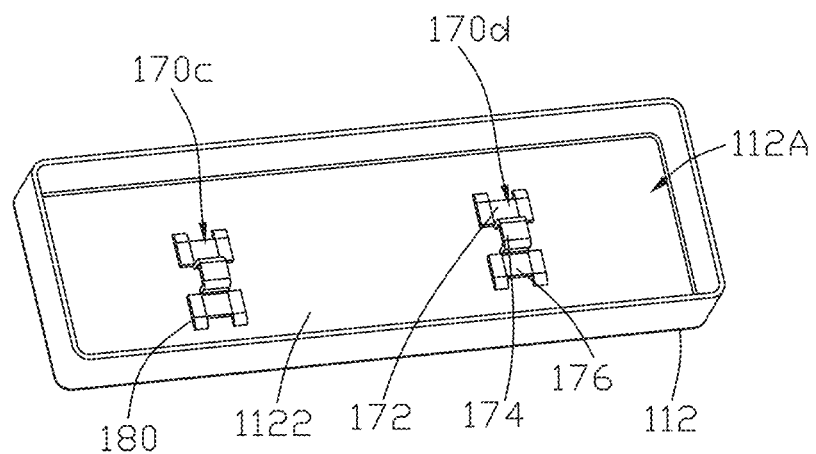
FIG. 5 is an assembled view of a shell, the positioning part and the block of the vibration motor.

Referring to FIGS. 4-5, the block 170 has a plurality of pieces individually assembled with the bottom wall 112 and the cover 114. The block 170 includes a first positioning segment 172, a protrusion 174 extending and bent from the first positioning segment 172, and a second positioning segment 176 extending from the protrusion 174. The first positioning segment 172 and the second positioning segment 176 are coplanar with each other. The protrusion is configured as a U shape.

In the embodiment, the amount of the blocks 170 is four. Two blocks 170 arranged between the first weight 1322 and the cover 114 are defined as a first block 170a and a second block 170b. The first positioning segments 172 and the second positioning segments 176 are engaged with the cover 114 by welding. And, the protrusions of the first block 170a and the second block 170b are respectively received in the two first restricting holes 1328.

Two blocks 170 arranged between the second weight 1342 and the bottom wall 1122 are defined as a third block 170c and a fourth block 170d. The first and second positioning segments 172, 176 are engaged with the bottom wall 1122 by welding. And, the protrusions of the third block 170c and the fourth block 170d are respectively received in the two second restricting holes 1349.

The positioning portions 180 have a plurality of pieces parallel to each other for engaging with the blocks 170. The positioning portions 180 are used for securing the blocks 170 and enhancing the impact resistance of the blocks 170.

The engagement between the block and the positioning portion will be described in detail by taking the cooperation between the first block 170a and the positioning portion 180 as an example. Positioning portions 180 are arranged at two sides of the first positioning segment 172, and the positioning portions 180 are also arranged at two sides of the second positioning segment 176. Thus, four positioning portions 180 are disposed at two opposed sides of the first block 170a for restricting the movement of the first block 170a. By the configuration mentioned above, the engagement between the block and the cover is accordingly enhanced, and the block will not be separated from the cover easily.

The positioning portions 180 for enhancing the stability of the first and second blocks 170a, 170b are located on the cover 114. In the embodiment, the positioning portions 180 are formed by stamping the cover 14 for forming a convex portion protruding toward the first weight 1322.

The positioning portions 180 for enhancing the stability of the third and fourth blocks 170c, 170d are located on the bottom wall 1122 of the shell 112. In the embodiment, the positioning portions 180 are formed by stamping the bottom wall 1122 for forming a convex portion protruding toward the second weight 1342.

For ensuring the strength of the positioning portion 180, the convex portion of the positioning portion located on the cover 114 has a height less than the distance between the cover 114 and the first weight 1322. And, the convex portion of the positioning portion located on the bottom wall 112 has a height less than the distance between the bottom wall and the second weight 1342.

The embodiment described above discloses a vibration motor having two vibration units. In fact, the solution described by the embodiment could also be applied to vibration motor having only one vibration unit. For such a vibration motor, the vibration unit includes a weight, a magnet or a coil engaging with the weight. The magnet is fixed on the housing, and the coil is fixed on the weight. Or, the magnet is fixed on the weight and the coil is fixed on the housing. The blocks are arranged between the housing and the weight.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor including:
    a housing forming a receiving space;
    a plurality of elastic members accommodated in the receiving space and connected to the housing;
    a vibration unit suspended by the elastic members in the receiving space, the vibration unit including a weight having a through hole;
    a plurality of blocks arranged on the housing, the block at least partially received in the through hole;
    a plurality of positioning portions formed on the housing and protruding toward the weight for engaging with the blocks for fixing the blocks.

2. The vibration motor as described in claim 1, wherein the positioning portions are located at opposed sides of the block for positioning the block.

3. The vibration motor as described in claim 1, wherein the housing includes a shell having a bottom wall, a cover engaging with the shell and parallel to the bottom wall, one of the block and the positioning portion is disposed on the bottom wall, and the other is disposed on the cover.

4. The vibration motor as described in claim 1, wherein the block includes a first positioning segment located between the housing and the weight, a protrusion extending and bent from the first positioning segment, and a second positioning segment extending from the protrusion, and each of the first and second positioning segments are fixed by the positioning portions.

5. The vibration motor as described in claim 4, wherein the vibration unit includes a first vibrator and a second vibrator opposed to the first vibrator, the first vibrator having a first weight, a magnet assembled with the first weight, and first restricting holes disposed at two ends of the first weight;
    the second vibrator having a second weight, a coil assembled with the second weight, and second restricting holes disposed at two ends of the second weight.

6. The vibration motor as described in claim 5, wherein the block includes a first block and a second block received in the first restricting holes, and a third and fourth blocks received in the second restricting holes.

7. The vibration motor as described in claim 1, wherein the positioning portion includes a convex portion having a height less than a distance between the weight and the housing.

* * * * *